Aug. 7, 1923.
H. E. CALLAHAN
APPARATUS FOR DESTROYING RODENTS
Filed Sept. 24, 1921
1,464,148
2 Sheets-Sheet 1
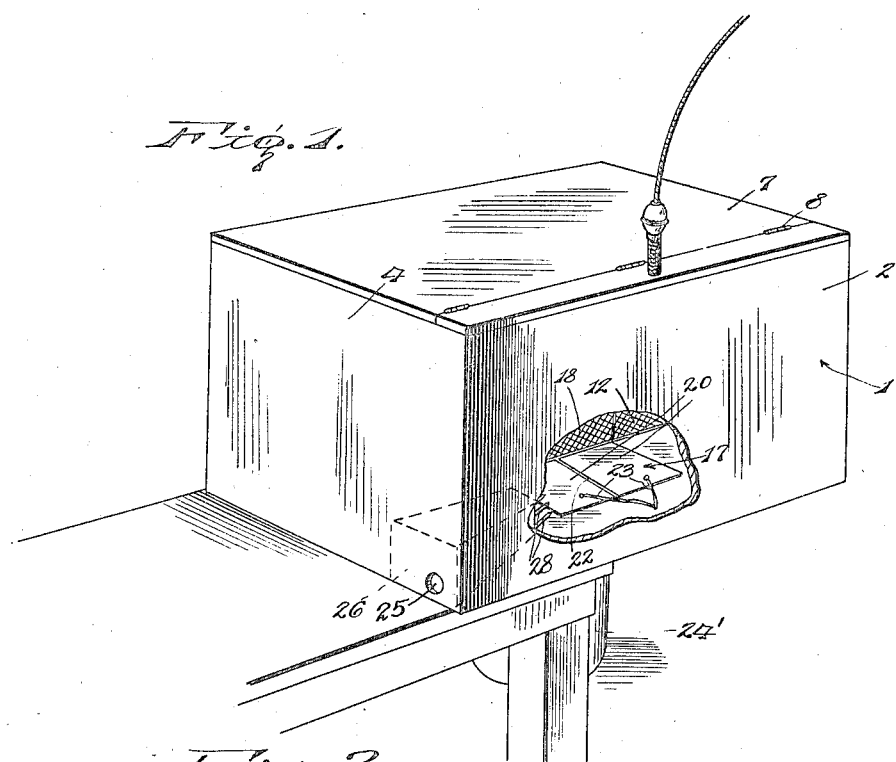
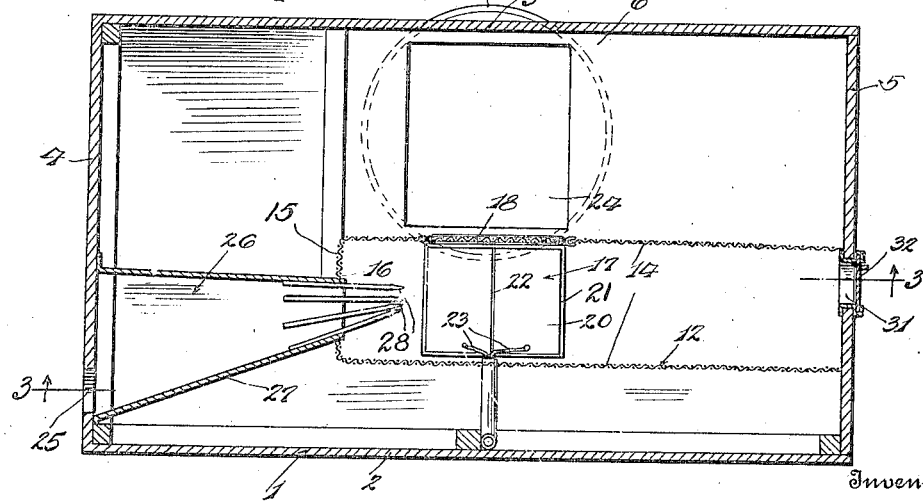
Inventor
H. E. Callahan.
By Lacy & Lacy, Attorneys

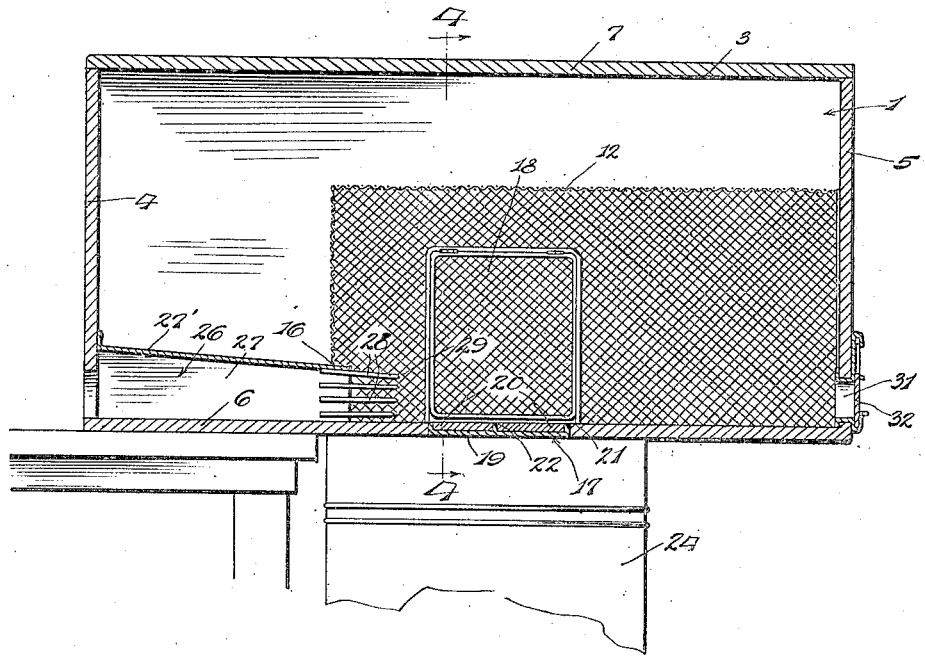
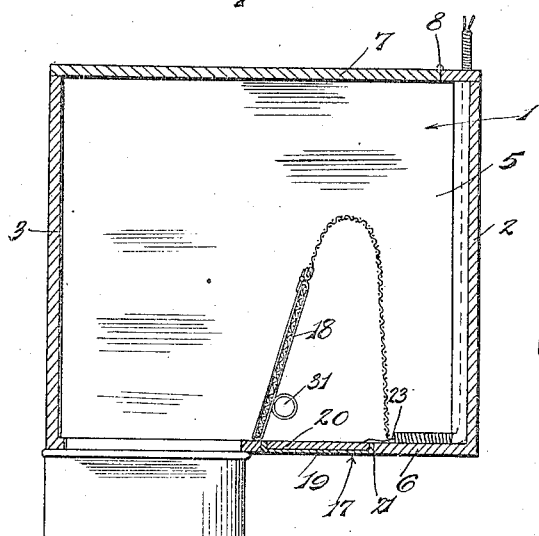
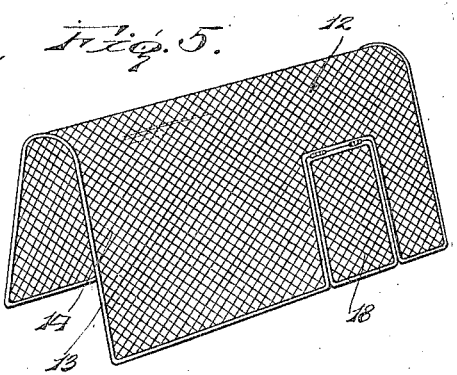

Patented Aug. 7, 1923.

1,464,148

UNITED STATES PATENT OFFICE.

HENRY E. CALLAHAN, OF KEARNEY, NEBRASKA.

APPARATUS FOR DESTROYING RODENTS.

Application filed September 24, 1921. Serial No. 502,856.

*To all whom it may concern:*

Be it known that I, HENRY E. CALLAHAN, a citizen of the United States, residing at Kearney, in the county of Buffalo and State of Nebraska, have invented certain new and useful Improvements in Apparatus for Destroying Rodents, of which the following is a specification.

This invention relates to an apparatus for destroying rodents and has as one of its objects to provide an apparatus by the use of which rats and other rodents may be effectually trapped and destroyed in large numbers and without any attention being required to be paid to the setting or care of the apparatus except the removal from time to time of the bodies of the rodents.

Another object of the invention is to provide an apparatus for the purpose stated in the use of which rodents entering the same may be electrocuted and their bodies automatically disposed of, thus leaving the way clear for other rodents to enter and be killed.

Another object of the invention is to so construct the apparatus that it will be unnecessary to frequently supply the same with bait inasmuch as provision is made for preventing the rodents gaining access to the bait although the same is so placed as to entice the rodents into the trap.

In the accompanying drawings:

Figure 1 is a perspective view of the apparatus embodying the present invention, a portion of the casing being broken away;

Figure 2 is a horizontal sectional view through the apparatus;

Figure 3 is a vertical longitudinal sectional view taken substantially on the line 3—3 of Figure 2, looking in the direction indicated by the arrows;

Figure 4 is a vertical transverse sectional view on the line 4—4 of Figure 3;

Figure 5 is a perspective view of a hood which is arranged within the casing of the apparatus and defines a runway.

The apparatus embodying the invention may be made in various sizes and the several component parts thereof may be relatively arranged in various ways and therefore the drawings are intended to illustrate merely one embodiment of the invention. In the drawings, the numeral 1 indicates in general a casing preferably of rectangular form illustrating and including side walls 2 and 3, end walls 4 and 5, a bottom 6, and a top 7 which latter may be hinged, if desired, as at 8, or otherwise adapted to be opened or removed to permit of access being gained to the interior of the casing. The casing may be made of any material found suitable for the purpose as for example sheet metal. A hood such as illustrated in detail in Figure 5 of the drawings and indicated in general by the numeral 12 is arranged within the casing and extends longitudinally of the same and this hood preferably consists of a frame 13 of any suitable material as for example rod material, and a web or covering for the frame indicated by the numeral 14 and of wire mesh. The hood 12 is of substantially the inverted U form shown in the drawings and the same is arranged with one open end abutting the end wall 5 of the casing, the hood at its other end being closed as indicated by the numeral 15 except near its bottom where it is formed with an opening 16.

In order that rodents entering the trap may be electrocuted and their bodies disposed of, an electrical contact means is supported within or upon the bottom of the casing and is indicated in general by the numeral 17. The device 17 comprises a base 19 which is of any suitable insulating material and into the upper face of which are set spaced plates 20 of copper or any other metal found suitable for the purpose. The base 19 is preferably provided marginally with an upstanding flange 21 protecting the outer edges of the plates 20 and preventing these edges from coming into contact with any adjacent metallic parts of the apparatus, the base being also provided between its ends with a transverse upstanding rib 22 of the same material which serves to relatively space and mutually insulate the adjacent edges of the plates 20. Conductor wires 23 are electrically connected with the plates 20 and lead to any suitable source of current supply as for example an electric light socket. It will now be evident that a rodent entering the trap and stepping upon the device, will come in contact with both of the plates 20 and will be convulsed by the current and thrown through a hinged door 18 mounted in the side of the hood. The bottom of the casing is formed, opposite the opening in which the door 18 is mounted, with an opening 24 beneath which may be arranged a suitable receptacle 24' to receive the body of the rodent.

In order that rodents entering the trap will be compelled to pass directly onto the device 17, an entrance opening 25 is provided in the end wall 4 of the trap and a runway 26 leads from this opening to the opening 16 in the hood. This runway 26 may be formed of sheet metal and comprises sides 27 and a top 27' and is tapered toward its inner end where it is fitted into the opening 16. Wire fingers 28 are secured at their inner ends to the sides and top of the runway at this end and project along converging lines and have pointed extremities 29. It will now be evident that rodents may leave the runway and enter the hood 12 but cannot return because of the sharply pointed extremities of the fingers 28.

An exit opening 31 is provided in the end wall 5 of the trap substantially opposite the exit end of the runway 26, and while this opening 31, when the apparatus is in actual use, is closed by a slide door 32 mounted upon the exterior of the wall 5, this door may be left open when the rodents are to have free access to the apparatus so that they may enter and leave the same without interference.

Having thus described the invention what is claimed as new is:

1. In apparatus of the class described, a compartment, an electrical contact device within the bottom of the compartment, the compartment having an unobstructed entrance opening in one end wall, a closed runway leading within the compartment from the said opening to a point immediately adjacent the contact device, and a hood of foraminous material within the compartment extending longitudinally thereof and enclosing the said runway and the contact device, the hood having a passageway opposite the contact device.

2. In apparatus of the class described, a compartment, an electrical contact device within the bottom of the compartment, the compartment having an entrance opening in one wall, a closed runway leading within the compartment from the said opening to a point immediately adjacent the contact device, and a hood of foraminous material within the compartment extending longitudinally thereof and enclosing the said runway and the contact device, the said hood having an opening in one side opposite the contact device, and a yieldably supported door normally closing said opening.

3. In apparatus of the class described, a compartment having an opening in one end wall and which opening is unobstructed, the compartment being provided with an opening in its bottom offset with relation to the point of location of the first-mentioned opening, a closed runway arranged within the compartment and in communication with the first-mentioned opening and having its outlet end located between the first and second-mentioned openings, a hood of foraminous material within the compartment extending longitudinally thereof and enclosing the said outlet end of the runway and having one side extending beside the second-mentioned opening, a door normally closed by gravity mounted upon the said side of the hood in close proximity to the said second-mentioned opening, and an electrical contact device within the compartment and housed within the hood and located opposite said door and in close proximity thereto.

In testimony whereof I affix my signature.

HENRY E. CALLAHAN. [L. S.]